(12) United States Patent
Kelley

(10) Patent No.: US 6,306,281 B1
(45) Date of Patent: Oct. 23, 2001

(54) ELECTROLYTIC PROCESS FOR THE GENERATION OF STABLE SOLUTIONS OF CHLORINE DIOXIDE

(76) Inventor: Joseph Matthew Kelley, 1321 E. Broad St., Westfield, NJ (US) 07090

( * ) Notice: Subject to any disclaimer, the term of this patent is extended or adjusted under 35 U.S.C. 154(b) by 0 days.

(21) Appl. No.: 09/451,972

(22) Filed: Nov. 30, 1999

(51) Int. Cl.[7] ................................................. C01B 11/02
(52) U.S. Cl. .......................................... 205/556; 205/499
(58) Field of Search ..................................... 205/556, 499

(56) References Cited

U.S. PATENT DOCUMENTS

| | | |
|---|---|---|
| 2,163,793 | 6/1939 | Logan . |
| 2,717,237 | 9/1955 | Remfel . |
| 2,871,097 | 1/1959 | Rapson . |
| 3,810,969 | 5/1974 | Schlumberger . |
| 3,904,496 | 9/1975 | Harke et al. . |
| 4,456,510 | 6/1984 | Murakami . |
| 4,542,008 | 9/1985 | Capuano et al. . |
| 4,683,039 | 7/1987 | Twardowski . |
| 4,767,510 | 8/1988 | Lipsztajn . |
| 4,798,715 | 1/1989 | Hardee et al. . |
| 4,806,215 | 2/1989 | Twardowski . |
| 4,839,004 * | 6/1989 | Castellini ............................ 205/556 |
| 4,915,927 | 4/1990 | Lipsztajn et al. . |
| 4,938,943 | 7/1990 | Norell . |
| 4,978,517 | 12/1990 | Norell et al. . |
| 4,986,973 | 1/1991 | Svedin . |
| 5,002,746 | 3/1991 | Norell . |
| 5,041,196 | 8/1991 | Cawlfield . |
| 5,064,514 | 11/1991 | Cancfield . |
| 5,084,148 | 1/1992 | Kaczur . |
| 5,084,149 * | 1/1992 | Kaczur et al. ...................... 205/556 |
| 5,122,240 | 6/1992 | Cowley . |
| 5,242,554 | 9/1993 | Kaczur et al. . |
| 5,419,816 | 5/1995 | Sampson . |
| 5,609,742 | 3/1997 | Sampson . |
| 5,705,050 | 1/1998 | Halox . |

* cited by examiner

*Primary Examiner*—Arun S. Phasge
(74) *Attorney, Agent, or Firm*—Margaret B. Kelley

(57) ABSTRACT

Chlorine dioxide dissolved in water is produced by passing a solution of stabilized chlorine dioxide or sodium chlorite solution, with or without added sodium chloride, through an electrolytic cell having an anode and cathode, in the absence of a semi-permeable membrane but in the presence of a buffer, an anolyte with a pH below 10 is produced so that disproportination of the $ClO_2$ is not appreciable.

16 Claims, 1 Drawing Sheet

ELECTROLYTIC PROCESS FOR THE GENERATION OF STABLE SOLUTIONS OF CHLORINE DIOXIDE

BACKGROUND OF THE INVENTION

1. Field of the Invention

This invention relates to a method of preparing chlorine dioxide in an electrolytic flow reactor. In particular, it relates to a method of preparing a stable solution of chlorine dioxide which will not disproportionate into chlorate and chlorite ions

2. Description of the Related Art

Early attempts by Logan (U.S. Pat. No. 2,163,793) to produce chlorine dioxide ($ClO_2$) by the electrolysis of sodium chlorite solution containing sodium chloride gave a 72% conversion of the chlorite to chlorine dioxide. However, the solution leaving the electrolytic cell had a pH of 11–12 due to the following reactions:

$$Na^+ + e^- \rightarrow Na$$

$$Na + H_2O \rightarrow NaOH + _2$$

The sodium hydroxide was the cause of the very high pH, which in turn caused the rapid decrease in $ClO_2$ concentration due to the following rapid, irreversible, disproportionation reaction:

$$2ClO_2 + 2OH^- \rightarrow ClO_3^- + ClO_2^- H_2O$$

Hence, if one intended to use the solution resulting from the above electrolysis as a deodorizer or disinfectant, the solution is practically useless due to the rapid loss of $ClO_2$ concentration. Also, as shown in the above equation, the hydroxyl ion concentration tends to decrease thereby gradually lowering the pH of the disproportionating solution.

This deficiency has been overcome in various patents by using a semi-permeable membrane between the anode and cathode. The theory of this approach has been elucidated by Kascur in U.S. Pat. No. 5,084,149, filed Apr. 4, 1991.

The semi-permeable membrane separates the effluents from each electrode. The chlorine dioxide produced at the anode has a pH of 2–3. The sodium hydroxide produced at the cathode has a pH of 12–13. The chlorine dioxide stream from the anode is very stable at that pH and useful as a deodorant or disinfectant.

However, it is very expensive to generate $ClO_2$ using this system. It is not cost effective for the small applications for which it was intended. This is due in part to the membrane cost and the membrane's sensitivity to divalent ions, the complicated design and cost of the cell and power supply, and the necessity to periodically dispose of the by-products, sodium hydroxide and hydrogen.

The industry had developed on-site chemical generators which use sodium chlorite and chlorine gas as reactants to produce chlorine dioxide by oxidation of the sodium chlorite. These generators are used in applications where large quantities of chlorine dioxide are required. However, the use of chlorine as a reactant has come into disfavor due to the hazards of storing large amounts of chlorine gas. It is possible to substitute a combination of sodium hypochlorite (NaOCl) and an acid as a feed for the on-site chemical generators. However, the cost of generating $ClO_2$ is increased appreciably.

Another approach to the generation of chlorine dioxide is to react sodium chlorite ($NaClO_2$) with acid such as hydrochloric acid. However, this system has the disadvantage of slow reaction kinetics and more importantly, a theoretical yield of only 80% due to the conversion of 1 mole of sodium chlorite to sodium chloride according to the following equation:

$$5NaClO_2 + 4HCl \rightarrow 4ClO_2 + 5NaCl + 2H_2O$$

Japanese Patent 1866 (1956) claims the electrolysis of an equal mixture by weight of sodium chlorite and sodium chloride with a copper or nickel cathode and a graphite anode. The overall equation for this reaction is:

$$2NaClO_2 + 2NaCl + H_2O \rightarrow 2ClO_2 + 2NaOH + H_2 3 \, 2NaCl$$

The yield is 72%. The hydrogen, sodium chloride and sodium hydroxide by-products are in contact with the chlorine dioxide, which results in an almost instantaneous loss of the chlorine dioxide due to the disproportionation reaction shown above, which is caused by the high pH of the sodium hydroxide containing effluent which renders the stream useless as a disinfectant/deodorizer due to the rapid loss of chlorine dioxide.

Japanese Patent 2316 (1956) discloses an electrochemical reduction of chlorates to chlorine dioxide in four compartments separated by ion exchange membranes using a porous carbon anode and an iron cathode.

U.S. Pat. No. 4,248,681 (issued Feb. 3, 1981 to Sweeney) discloses an electrolytic process in two sealed compartments separated by a Nafion R membrane using salt as the feed. A mixture of chlorine and chlorine dioxide is produced. Pure chlorine dioxide is never produced. British Patent No.714, 828 (published Sep. 1, 1954) describes the electrolysis of a chlorite solution containing a water-soluble salt of an inorganic oxy-acid other than sulfuric acid.

Electrolysis of a chlorite solution containing a water-soluble metal sulfate is disclosed in U.S. Pat. No. 2,717,237 (issued Sep. 6, 1955 to Rempelin).

Control of the concentration of sodium chlorite in the anolyte at 0.8–5% by means of a photometer is disclosed in U.S. Pat. No. 4,542,008 (issued Sep. 17, 1985 to Capuano). A permselective membrane and electrodes containing an electrochemically active coating are used.

A particularly complicated electrolytic system has been patented by Halox in U.S. Pat. Nos. 5,419,816, 5,609,742 and 5,705,050. These patents describe a system in which the anode and cathode are separated by cation exchange membrane. In addition, the space between the anode and the cation exchange membrane is packed with a cation exchange resin, which must be replaced when spent. It is obvious that this cell is complicated and costly to construct and maintenance costs are high due to the need to replace the cation exchange membrane and cation exchange resin. Also the unit has capacity limitations due to the packing and cell construction.

BRIEF SUMMARY OF THE INVENTION

The present invention provides a simple, inexpensive system for the generation of chlorine dioxide, without membranes or ion-exchange resins. It comprises a pipe cell wherein stabilized chlorine dioxide or chlorite solution, used as the reactant, flows through the cell from bottom to top (up-flow) and where a buffer system is used to control the pH of the effluent The cathode consists of an outer stainless steel pipe. The anode consists of a carbon electrode or a dimensionally stable anode. The anode is positioned in the center of the pipe and insulated from the cathode. The power supply can be a DC source of 3–12 volts. A low cost D.C. power supply is adequate for this application.

The improvement in this system is the production of a continuous stream of chlorine dioxide gas dissolved in an aqueous solution at a pH below 10 due to the presence of the buffer. The resulting solution is stable and will not disproportionate on standing.

BRIEF DESCRIPTION OF THE DRAWING

The electrolytic cell is shown in FIG. I. The outer wall of the cell comprises a metal pipe, such as a stainless steel pipe, with a tab welded onto the surface to act as a connector for the electric connection (cathode). The anode is positioned in the center of the pipe and insulated from the cathode by plastic caps at both ends of the stainless steel pipe. The anode is either carbon plated with lead dioxide or a dimensionally stable anode (i.e., a metal such as titanium coated with a precious metal group such as platinum, palladium or iridium). The flow of liquid is into the bottom of the cell and out of the top of the vertically mounted pipe. A source of DC voltage is connected to the pipe flow cell, – to the cathode and + to the anode. No membrane, asbestos barrier, or resin bed is required in this simple cell design.

DETAILED DESCRIPTION OF THE INVENTION

Figure 1:
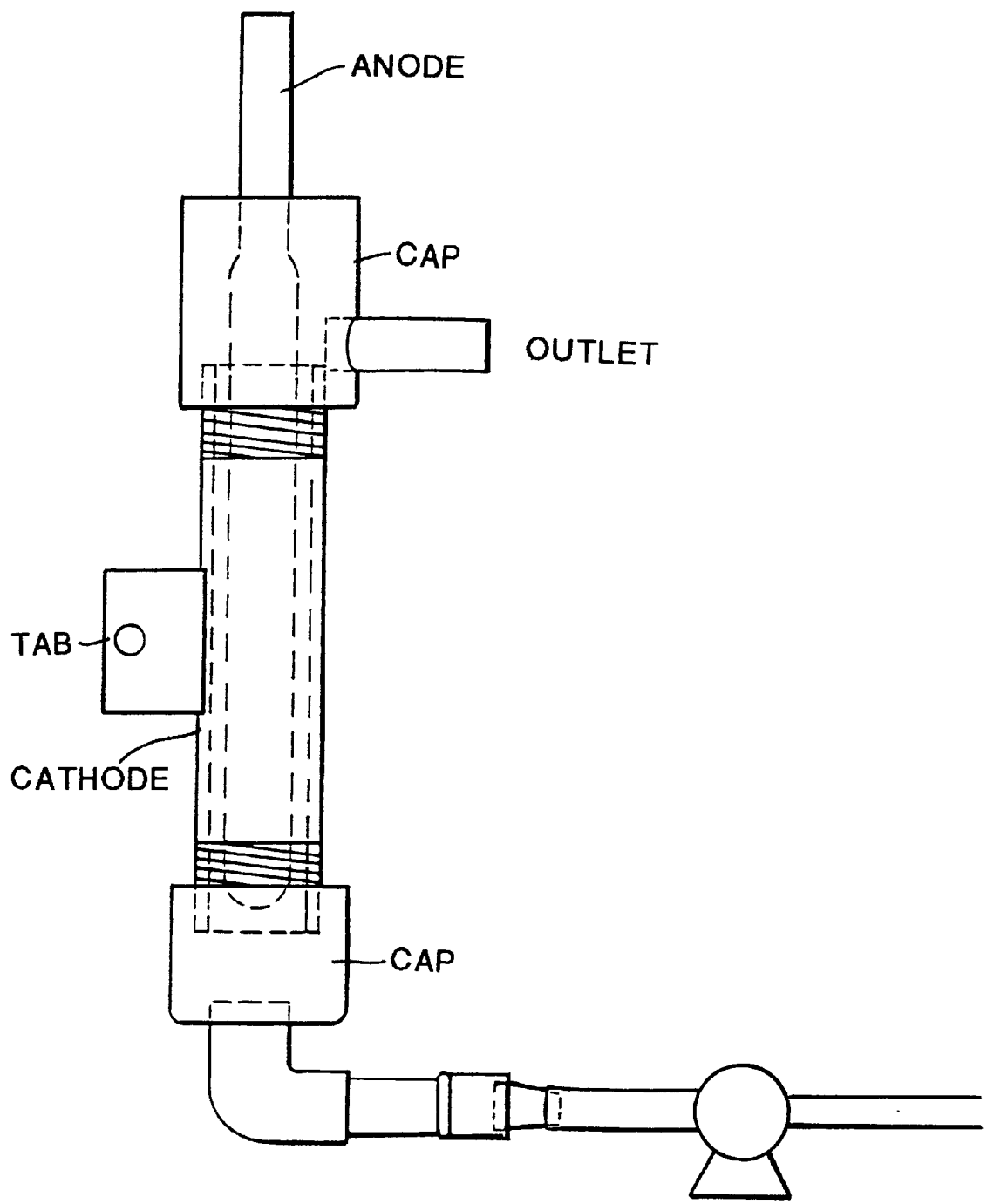

The electrolyte is a stabilized chlorine dioxide or a sodium chlorite solution having a concentration between 0.01–5.0% wt. of total available chlorine dioxide. A buffer such as $NaH_2PO_4$ is added to the electrolyte to control its conductivity and the pH of the resulting electrolyzed solution. Optionally, but preferably, 0.5–2.5% wt. of sodium chloride is added to impart further control to the conductivity of the electrolyte. The mixture (i.e., electrolyte, buffer and optionally sodium chloride) is then passed through the cell at various flow rates and applied voltage to attain high conversions to $ClO_2$.

The reactions occurring in this cell at the cathode are sodium ions acquiring an electron (e) and being reduced to sodium metal.

$$Na^+ + e^- \rightarrow Na$$

The sodium metal then immediately reacts with water to produce sodium hydroxide and hydrogen as shown in equation below.

$$Na + H_2O \rightarrow NaOH + H_2O$$

Chlorine is formed at the anode by the reaction:

$$Cl^- - 2e^- \rightarrow Cl_2$$

In the reaction at the anode the chlorite ion loses an electron to form chlorine dioxide as shown in the following equation:

$$ClO_2^- - e^- \rightarrow ClO_2$$

or chlorine immediately reacts with sodium chlorite to form chlorine dioxide plus sodium chloride as shown in the following equation:

$$2NaClO_2 + Cl_2 \rightarrow 2ClO_2 + 2NaCl$$

Another possible reaction in the electrolytic cell is the reduction of chlorate ion to chlorine dioxide in an acid medium by the following reaction:

$$NaClO_3 + 2H^+ \rightarrow ClO_2 + \frac{1}{2}H_2O + NaCl$$

The resulting chlorine then reacts with some of the sodium chlorite to form more $ClO_2$ as follows:

$$2NaCl_2 + Cl_2 \rightarrow 2ClO_2 + 2NaCl$$

The key to producing a useful solution of chlorine dioxide from a pipe cell of the type shown in FIG. I is to add a buffer to the electrolyte solution to control the pH of the effluent to a pH below 10, preferably in the pH range of 8–9, but possibley as low as 5. This is accomplished by the addition of various buffers which have the capacity to absorb appreciable amounts of hydroxyl ion and to prevent the pH from rising to a level which will allow the disproportionation reaction to take place. This is illustrated below.

$$H_3BO_3 + 3NaOH \rightarrow Na_3BO_3 + 3H_2O$$

Likewise, phosphate, citrate, and carbonate buffers can be used in the same manner, thusly:

$$NaH_2PO_4 + NaOH \longrightarrow Na_2HPO4 + H_2O$$

$$Na_2HPO_4 + NaOH \longrightarrow Na_3PO_4 + H_2O$$

or $$NaHCO_3 + NaOH \longrightarrow Na_2CO_3 + H_2O$$

Citric acid, being a tribasic acid reacts in the same manner, acting as a buffer. Sufficient buffer is added to absorb all of the NaOH which can be generated by high conversions of stabilized chlorine dioxide (Brand Names—Anthium Dioxcide, Purogene Professional, Carnebon 200, Cryocide 20, Purogene or Oxine) or buffered chlorite to chlorine dioxide.

For example, in 2% stabilized chlorine dioxide, one would expect about 0.03 moles of NaOH per 100 grams of solution to be generated on electrolysis, requiring about 0.6 grams of boric acid to control the pH.

In like manner, the pipe cell will produce hypobromous acid from a feed of sodium bromide, sodium chloride and a buffer to control the final solution pH according to the following equations:

$$Na^+ + e^- \rightarrow Na$$

$$Na + H_2O \rightarrow NaOH + H_2$$

$$2Cl^- - e^- \rightarrow Cl_2$$

$$Cl_2 + H_2O \rightarrow HOCl + HCl$$

$$HOCl + NaBr \rightarrow HOBr + NaCl$$

Bromine generated from the electrolysis of bromide ion will react with water to produce additional HOBr. As in the case of sodium chlorite electrolysis, buffers are used to control the pH of the effluent electrolyte, preferably in the range of pH 5–9.

COMPARATIVE EXAMPLES

An electrolyte solution was prepared by mixing 9 grams of 80% technical sodium chlorite, 22.5 grams of sodium chloride, and 3.0 liters of water. This solution was passed through the Pepco cell at a rate of 92 cc/min. A D.C. power source supplied 6 volts and the current was 6.4 amps. Under these conditions, the cell produced 525 ppm of free chlorine dioxide from a total available chlorine dioxide content of 1,406 ppm at a pH of 11.7. The conversion of chlorite to chlorine dioxide was 37%. However, the effluent solution was useless for disinfection or odor control as shown by the fact that the color of the solution disappeared almost immediately indicating that the disproportionation reaction was taking place rapidly. Free chlorine dioxide is the molecular chlorine dioxide in the form of a water soluble yellow gas. Total available chlorine dioxide is the amount of free chlorine dioxide which could be generated from a given chlorite solution if it was all converted to $ClO_2$. Numerous other experiments were conducted under the same conditions, with essentially the same results, as shown in Table I.

For example, a solution made up by dissolving 3 grams of 80% technical sodium chlorite and 15 grams of sodium chloride in 3 liters of water was passed through the Pepcon cell at 106 cc/min. The cell drew a current of 3.2–3.3 amps at 6 volts DC. The total available chlorine dioxide before electrolysis was 564 ppm at a pH of 7.2. After electrolysis, the pH of the solution was 11.1, the free chlorine dioxide was 310 ppm and the total available chlorine dioxide was 430 ppm. This gave a conversion of 55% based on the original total available chlorine dioxide and 72% based on the total available chlorine dioxide available in the effluent from the cell. In 30 minutes the color had almost disappeared from the solution (20 ppm free) and the pH had decreased to 8.48, indicating that the disproportionation reaction had occured.

Since the disproportionation reaction does not occur to any extent at lower pH, the cell was then operated with a solution designed to maintain the pH below 7–8. This approach is wherein the invention lies. Several systems should be considered for control of the effluent pH, namely potassium acid phthalate, boric acid, sodium bicarbonate, and sodium dihydrogen phosphate plus any other system capable of pH control. Examples of the use of each of these systems are given in Table I, Runs 14–18.

The pH of the effluents from these runs are in the range of 5–9. No loss of chlorine dioxide was noted over time due to the disproportionation reaction. In addition, periodic removal of sodium hydroxide from the cathode was not required (as with the membrane cell) since the sodium hydroxide and hydrogen produced is in the pipe cell's effluent. In small cells the hydrogen production is not a problem but in larger cells it should be vented from the cell electrolyte.

Of course, a similar result can be obtained by omitting the buffers used in Runs 14–18 and then adjusting the pH of the effluent by adding acid but this adds an extra step to the process and requires complicated equipment to add acid to a controlled pH. Additionally, the disproportation reaction takes place until the pH is lowered, resulting in some loss of chlorine dioxide.

The electrolysis of a 2% stabilized chlorine dioxide is carried out by adding an appreciable quantity of a reagent (2 to 20 grams per liter, preferably 10 gpl) which is capable of forming a buffer with the ingredients of Carnebon 200, such boric acid, sodium dihydrogen phosphate, potassium acid phthalate, or sodium bicarbonate, etc. This solution is then passed through a Pepcon 20 amp. laboratory cell at the optimum rate of flow to give maximum conversion to free chlorine dioxide. The conversion is at least 60% and the pH of the resulting solution is below 10, preferably in the range of 8–9.

This pH range prevents the disproportionation of chlorine dioxide to chlorate and chlorite. The Pepcon cell has a lead oxide stabilized graphite anode and a stainless steel cathode. The applied voltage can vary between 3–12 volts D.C. The pipe cell is identical to the Pepcon cell except that the anode is a dimensionally stable anode as described above.

A less desirable alternative is to add acid or buffers to the effluent to reduce the pH from 11–12 down to 8–9, rather than including them in the cell feed. This approach will prevent the disproportionation reaction from proceeding, but there is some loss due to the speed of the reaction before the buffering takes effect.

Another alternative is to pass the effluent through an acid ion exchange resin to lower the pH of the solution to 8–9 to prevent the undesirable disproportination reaction from taking place. Another possible approach to pH control is dilution with neutral or acidic water.

EXAMPLES

Example 1

A solution of Anthium Dioxcide®, containing 50,000 ppm stabilized chlorine dioxide was run through the flow cell shown in FIG. I at a flow rate of about 50 cc/minute. The voltage was 6 volts and the current was 5 amperes. The Anthium Dioxcide® contains a sodium carbonate—sodium bicarbonate buffer. The conversion was high, as evidenced by the dark orange color of the effluent. The run was terminated immediately due to the high concentration of chlorine dioxide being generated and no quantitative data was determined for this run.

Example 2

Carnebon 200®, which contains 20,000 ppm stabilized chlorine dioxide is run through the flow cell at a rate of 30 cc/minute, 6 volts and 4.8 amperes. The Carnebon 200® contains a sodium carbonate—bicarbonate buffer. It is further buffered by addition of 10 grams/liter of boric acid before the electrolysis. The effluent from the cell is diluted 3/1 with deionized water. The diluted stream should then contain about 3000 ppm free $ClO_2$ and a have pH of 8.3. The solution is stable at this pH with no tendency to disproportionate.

Example 3

The electrolysis is repeated under the conditions shown in Example 2 except that the boric acid buffer is omitted. The amperes observed in this example will be slightly reduced and on dilution the solution will have only about 2500 ppm free $ClO_2$ and the pH should be about 8.9. The solution will not lose its yellow color, which would indicate disproporination and a decreased chlorine dioxide concentration.

Example 4

Carnebon 200® is diluted 1/1 with deionized water to give a feed solution containing 10,000 ppm total available chlorine dioxide. This solution is then passed through the flow cell of FIG. 1 at a rate of 25 cc/minute, at 6 volts and 4.3 amperes. After electrolysis, the solution should be immediately diluted 1/1 with deionized water and should contain a $ClO_2$ concentration of about 3000 ppm free $ClO_2$ and have pH of 8.9. No decolorization of the solution should be observed on standing.

Example 5

A solution of 1 gram per liter of sodium chlorite, 5 grams per liter of sodium chloride, and 2 grams per liter of potassium hydrogen phthalate (KHP) was prepared. This solution was passed through the electrolysis cell at a rate of 125 cc/min. at 6 volts, giving a current of 2.9 amps. The resulting undiluted solution had a free chlorine dioxide concentration of 350 ppm and a total available chlorine dioxide concentration giving an 85% conversion. The solution had a pH of 5.6, was stable and did not disproportionate to chlorite and chlorate.

Example 6

The solution of Example 5. was passed through the same cell at a rate of 150 cc/min. and a current of 3 amperes. The resulting solution had a free chlorine dioxide content of 330 ppm and a total available chlorine dioxide content of 421 ppm for a conversion of 78%.

Example 7

A solution of 1 gram per liter of sodium chlorite, 5 grams per liter of sodium chloride, and 2 grams per liter of boric acid was prepared. This solution was passed through the cell at a rate of 100 cc/min. at 6 volts and 2.6 amperes current. The effluent had a free chlorine dioxide content of 350 ppm and a total available chlorine dioxide content of 389 ppm for a conversion of 90w. The pH of the solution was 8.3. This solution showed no tendency to disproportionate.

Example 8

A solution of 1 gram per liter of sodium chlorite, 5 grams per liter of sodium chloride, and 2 grams per liter of sodium bicarbonate was passed through the cell at a rate of 100 cc/min. at 6 volts and 3 amperes current. The effluent from the cell had a pH of 8.9, a free chlorine dioxide content of 150 ppm and a total available chlorine dioxide content of 364 ppm for a conversion of 41%. The solution was stable in color.

Example 9

A solution containing 1 gram per liter of sodium chlorite and 5 grams per liter of sodium chloride was electrolyzed at a feed rate of 106 cc/min. at 6 volts and 3.2 amperes. The effluent from the cell had a pH of 11.1, a free chlorine dioxide content of 310 ppm and a total available chlorine dioxide content of 430 ppm for a conversion of 72%. The high pH effluent began to immediately disproportionate to chlorite and chlorate. very quickly this solution became colorless indicating complete loss of the free chlorine dioxide in solution.

Example 10

Example 2 is repeated except that 10 grams per liter of sodium chloride is added to the Carnebon 200® stabilized chlorine dioxide solution before electrolysis. The electrolysis conditions are repeated exactly as in Example 2. After dilution with 3 parts water to 1 part of the cell effluent electrolyte should have 4000 ppm free chlorine dioxide and a pH of 8.3, with no tendency to disproportionate.

Example 11

Example 9 is repeated using an eductor downstream from the cell. Municipal water is supplied to the eductor and the effluent from the cell is fed into the throat of the eductor. The flow rates of the effluent stream and the municipal water stream are adjusted so that the final concentration of the free chlorine dioxide is 5 ppm. The pH of the total stream should be about 9.5 and the color of the solution should be stable. No appreciable disproportination should occur.

Example 12

Example 11 is repeated but an acid or an acidic buffer is added to the throat of the eductor in an amount sufficient to give a pH in the range of 7 to 8.9. The color of the solution should be stable and should contain 5 ppm free chlorine dioxide and should show no decrease.

Example 13

A solution containing 31,400 ppm of sodium chlorate is mixed 1:1 by volume with 20,000 ppm of stabilized chlorine dioxide, to provide a solution containing 15,704 ppm of sodium chlorate and 13,422 ppm of sodium chlorite. Two grams per liter of potassium acid phthalate is added to this solution. It is passed through a Pepcon cell at a rate of 150 cc/minute at a voltage of 6 volts and a current of about 4.5 amperes. When 1 part of the effluent from the cell is diluted with 4 parts water, the concentration of free (molecular) chlorine dioxide should be about 3000 ppm. This indicates some reduction of the chlorate to chlorine dioxide as well as the oxidation of chlorite to chlorine dioxide in the same electrolytic cell.

Example 14

A total of 60 parts of salt water obtained from the ocean (about 30,000 ppm sodium chloride) is mixed with 40 parts of 2% stabilized chlorine dioxide to give a feed solution containing about 8,000 ppm total available chlorine dioxide and 18,000 ppm sodium chloride as a feed solution for a 5–5M Cloropac® unit (Electrolytic Hypochlorite Generation Cell). This cell is designed, when operated at a feed rate of 20 gallons per minute to produce 0.5 lbs. per hour of sodium hypochlorite at a concentration of 50 ppm. The effluent from this cell should have a pH of about 8.9 and a free chlorine dioxide content of 500 ppm and 50 ppm of sodium hypochlorite. After dilution, this solution can be used as an antimicrobial in the water used for cooling, ballast water, effluent sewage treatment and the main on-board seawater flow. The effluent from this cell can also be used in the condenser cooling in power plants and offshore oil drilling and production facilities to control marine growth. Slower feed rates will tend to give higher conversions to chlorine dioxide and sodium hypochlorite. When seawater feed is used, it should be noted that additional buffer should be added to control the pH of the effluent in the presence of the generated sodium hypochlorite. If fresh water, containing no salt, is used to dilute the stabilized chlorine dioxide or neat stabilized chlorine dioxide alone is used as feed without the chloride, no additional buffer may be required and chlorine dioxide alone will result, with no co-produced sodium hypochlorite.

Example 15

A solution containing 5 grams/liter of sodium chlorite, 7.5 grams per liter of sodium chloride, and 10 grams per liter of sodium dihydrogen phosphate was passed through the pipe cell having a dimensionally stable center anode at a rate of 30 gallons per day at 12 volts and 20 amps. The temperature of the cell electrolyte was 12 degrees Centigrade and the pH was 6.2. The molecular chlorine dioxide content of the solution was 1252 ppm from a total available $ClO_2$ content of 2197 ppm, giving a conversion of 57% (Run #5 in Table I). At this pH there was no tendency towards disproportionation of the chlorine dioxide to chlorate and chlorite.

Example 16

A solution containing 5.0 grams per liter of stabilized chlorine dioxide and 10 grams per liter of $NaH_2PO_4$ was electrolyzed through the same cell as in Example 15 at a rate of 17.5 ml per minute, giving a residence time of 13.1 minutes for the solution in the cell. The voltage was 12 and the current was 9 amps, giving a cell effluent having a pH of 5.9 and 720 ppm of free (molecular) $ClO_2$ from a solution having a total available $ClO_2$ content for a 60.9% conversion. Again there was no loss of chlorine dioxide through disproportionation.

Example 17

A solution containing 6.0 grams per liter of sodium chloride, 1.0 gram per liter of sodium bromide and 2.0 grams of potassium hydrogen phthalate is passed through the pipe cell at a rate of 200 ml. per minute. The voltage in the cell was 12 volts and the current was 7.0 amps. The amount of HOBr produced in the solution was 1336 ppm at a pH of 5.7.

What is claimed is:

1. An electrolytic process for generating a stable solution of chlorine dioxide, which process comprises the steps of:
   a) preparing an aqueous solution containing chlorite ions in a concentration of about 10 to about 80,000 ppm;
   b) adding a buffering agent and/or an acid to the aqueous chlorite solution in an amount sufficient to control the pH of the chlorine dioxide solution at a pH of about 9.5 or below after electrolysis;
   c) passing the buffered and/or acidified aqueous chlorite solution through an electrolytic cell containing an anode and a cathode, but no membrane, to electrolyze the chlorite to chlorine dioxide and generate the stable solution of chlorine dioxide; and
   d) optionally diluting the stable solution of chlorine dioxide to a concentration effective for disinfecting, sanitizing, or deodorizing.

2. An electrolytic process for generating a stable solution of chlorine dioxide, which process comprises the steps of:
   a preparing an aqueous solution containing chlorite ions in a concentration of about 10 to about 80,000 ppm;
   b) passing the chlorite solution through an electrolytic cell containing an anode and a cathode, but no membrane, to electrolyze the chlorite and generate a solution of chlorine dioxide as the electrolyte effluent;
   c) adjusting the pH of the effluent to a pH below about 9.5 to stabilize the solution of chlorine dioxide; and
   d) optionally diluting the stable solution of chlorine dioxide to a concentration effective for disinfecting, sanitizing, or deodorizing.

3. The process of claim 1 or 2, wherein the aqueous chlorite solution is a sodium chlorite solution which further contains sodium chloride.

4. The process of claim 3, wherein the electrolytic cell is a cell designed to generate chlorine dioxide and sodium hypochlorite from sodium chlorite and sodium chloride.

5. The process of claim 3, wherein the sodium chloride is provided by sea water.

6. The process of claim 2, wherein the pH of the effluent is adjusted by adding an acid and/or a buffering agent, passing the effluent through an acid ion exchange resin, or by diluting the effluent with neutral or acidic water.

7. An electrolytic process for generating a stable solution of chlorine dioxide, which process comprises the steps of:
   a) preparing an aqueous solution containing a chlorite, a chlorate, and a buffering agent and/or acid capable of maintaining the pH below about 7.0;
   b) passing the buffered and/or acidified aqueous solution through an electrolytic cell which comprises an anode and a cathode, but no membrane, to produce an aqueous solution of chlorine dioxide; and
   c) optionally diluting the aqueous solution of chlorine dioxide to a concentration effective for disinfecting, sanitizing, or deodorizing.

8. The process of claim 1, 2 or 7, wherein the chlorite ions are alkali metal chlorite ions or alkaline earth metal chlorite ions.

9. The process of claim 8, wherein the alkali metal chlorite ions are sodium chlorite ions.

10. The process of claim 8, wherein the alkaline earth metal chlorite ions are calcium chlorite ions.

11. An electrolytic process for generating hypobromous acid, which process comprises the steps of:
    a) preparing an aqueous solution containing sodium cations and chloride and bromide anions;
    b) adding a buffer and/or an acid to the aqueous solution in an amount sufficient to maintain the pH of the solution between about 5 and about 8 after electrolysis;
    c) passing the buffered and/or acidified solution through an electrolytic cell containing an anode and a cathode, but no membrane, to electrolyze the sodium bromide to an aqueous solution of hypobromous acid; and
    d) optionally diluting the aqueous solution of hypobromous acid to a concentration effective for disinfecting, sanitizing, or deodorizing.

12. The process of claim 1, 2, 7, or 11, wherein the buffering agent is selected from the group consisting of citrate, acetate, phosphate, borate and carbonate.

13. The process of claim 1, 2, 7, or 11, wherein the anode is a lead oxide-coated graphite anode.

14. The process of claim 1, 2, 7, or 11, wherein the anode is a dimensionally stable metal anode.

15. The process of claim 14, wherein the dimensionally stable metal anode is a titanium anode coated with a precious metal.

16. The process of claim 15, wherein the precious metal is selected from the group consisting of platinum, palladium, and iridium.

* * * * *

UNITED STATES PATENT AND TRADEMARK OFFICE
CERTIFICATE OF CORRECTION

PATENT NO. : 6,306,281 B1
DATED : October 23, 2001
INVENTOR(S) : Joseph M. Kelley It is certified that error appears in the above-identified patent and that said Letters Patent is hereby corrected as shown below:

Column 3,
Line 46, delete "O" from second "$H_2O$"
Line 64, delete "½" before "$H_2O$"

Column 4,
Line 1, rewrite "$2NaCl_2$" as -- $2NaClO_2$) --

Column 7,
Line 19, delete "W" after "90" and add -- % --

Column 9,
After line 16, insert Table 1 (attached).

Signed and Sealed this

Twenty-sixth Day of August, 2003

JAMES E. ROGAN
*Director of the United States Patent and Trademark Office*

TABLE I

ELECTROLYTIC PIPE FLOW CELLS

| DATE | | | | | | | | | | | | | | | | | | |
|---|---|---|---|---|---|---|---|---|---|---|---|---|---|---|---|---|---|---|
| RUN # | 1 | 2 | 3 | 4 | 5 | 6 | 7 | 8 | 9 | 10 | 11 | 12 | 13 | 14 | 15 | 16 | 17 | 18 |
| GRAMS NaClO2 / LITER | 5 | 5 | 5 | 5 | 5 | 5 | 5 | 20 | | | | | | 1 | 1 | 1 | 1 | 1 |
| GRAMS ANTHIUM DIOXIDE / LITER | | | | | | | | | 8 | 5.5 | 2.5 | 5.0 | 5.0 | | | | | |
| GRAMS NaCl / LITER | 5 | 5 | 5 | 5 | 7.5 | 7.5 | 7.5 | 10 | 7.5 | 7.5 | 7.5 | 7.5 | 7.5 | 5 | 5 | 5 | 5 | 5 |
| GRAMS NaH2PO4 / LITER | 10 | 10 | 10 | 10 | 10 | 50 | 10 | 10 | 10 | 10 | 10 | 10 | 10 | KHP 2 | KHP 2 | H3BO3 2 | NAHCO3 2 | CONTROL |
| VOLTS (L)OW / (H)IGH | L | L | H | H | H | H | H | H | | | | | | | | | | |
| FLOW (G)GAL/DAY (M) ml/min | G 30 | G 40 | G 40 | G 30 | G 30 | G 30 | G 40 | G 40 | M 25 | M 17.7 | M 19.6 | M 18.1 | M 17.5 | M 125 | M 150 | CC/MM 100 | CC/MM 100 | CC/MM 106 |
| pH | 6.23 | 6.17 | 6.33 | 6.10 | 6.2 | 6.53 | | | 7.56 | 6.54 | 7.97 | 6.15 | 5.92 | 5.6 | 5.3 | 8.3 | 8.9 | 11.1 |
| RESIDENCE TIME, MIN | | | | | | | | | 9.2 | 13 | 11.7 | 12.7 | 13.1 | | | | | |
| TEMP oC | | | 11 | 9 | 12 | 13 | | | 1.2 | 1.2 | 1.2 | 6 | 9 | 2.9 | 3 | 2.6 | 3.0 | 3.2 |
| AMPS | 8.7 | 10 | 21.2 | 20.8 | 24.4 | 23.8 | | | 597 | 1800 | 432 | 1215 | 720 | 350 | 330 | 350 | 150 | 310 |
| FREE ClO2 | 938 | 640 | 1155 | 1084 | 1252 | 891 | | | 7350 | 5913 | 1705 | 2310 | 1182 | 413/516 | 421/500 | 389/486 | 364/455 | 430/564 |
| TOTAL ClO2 | 2421 | 2392 | 2226 | 2325 | 2197 | 2318 | | | 8.1 | 30.4 | 25.3 | 52.6 | 60.9 | | | | | |
| YIELD % | 38 | 35 | 52 | 47 | 57 | 38 | | | | | | | | | | | | |
| CELL | PIPE | PIPE | PIPE | PIPE | PIPE | PIPE | PIPE | PIPE | PIPE | PIPE | PIPE | PIPE | PIPE | PEPCO | PEPCO | PEPCO | PEPCO | DECOLORIZ |